US008866956B2

(12) United States Patent
Yasuda

(10) Patent No.: US 8,866,956 B2
(45) Date of Patent: *Oct. 21, 2014

(54) IMAGE CAPTURING APPARATUS AND CONTROL METHOD THEREFOR

(71) Applicant: Canon Kabushiki Kaisha, Tokyo (JP)

(72) Inventor: Hitoshi Yasuda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/905,598

(22) Filed: May 30, 2013

(65) Prior Publication Data
US 2013/0258169 A1 Oct. 3, 2013

Related U.S. Application Data

(63) Continuation of application No. 13/610,036, filed on Sep. 11, 2012, now Pat. No. 8,471,951, which is a continuation of application No. 12/417,355, filed on Apr. 2, 2009, now Pat. No. 8,289,439.

(30) Foreign Application Priority Data

Apr. 9, 2008 (JP) ................................ 2008-101820

(51) Int. Cl.
G03B 13/00 (2006.01)
H04N 5/232 (2006.01)
G03B 13/32 (2006.01)

(52) U.S. Cl.
CPC ............ *H04N 5/23212* (2013.01); *G03B 13/32* (2013.01); *H04N 5/23219* (2013.01)
USPC .......................................... 348/349; 396/153

(58) Field of Classification Search
USPC ........................................................ 348/349
See application file for complete search history.

(56) References Cited

U.S. PATENT DOCUMENTS 5,204,710 A * 4/1993 Tsukamoto et al. ............ 396/85
5,631,697 A * 5/1997 Nishimura et al. ........... 348/172
(Continued)

FOREIGN PATENT DOCUMENTS

JP 2005-055744 A 3/2005
JP 2007-065290 A 3/2007
(Continued)

OTHER PUBLICATIONS

The above foreign patent documents were cited in a May 2, 2014 Japanese Office Action, a copy of which is enclosed without an English Translation, that issued in Japanese Patent Application No. 2013-189384.

*Primary Examiner* — Clayton E Laballe
*Assistant Examiner* — Dennis Hancock
(74) *Attorney, Agent, or Firm* — Cowan, Liebowitz & Latman, P.C.

(57) ABSTRACT

In an image capturing apparatus that carries out TV-AF type autofocus control by setting an AF frame on a predetermined object, for example a person's face, that is detected in an image, in a case in which a in-focus position search direction cannot be determined from an AF evaluation value, changes in the size of the region of the object are detected and focus detection is carried out by determining the in-focus position search direction based on the changes in the size of the region of the object.

12 Claims, 7 Drawing Sheets

(56) References Cited

U.S. PATENT DOCUMENTS

| | | | |
|---|---|---|---|
| 8,289,439 B2* | 10/2012 | Yasuda | 348/349 |
| 8,471,951 B2* | 6/2013 | Yasuda | 348/349 |
| 2006/0109370 A1* | 5/2006 | Yamazaki | 348/345 |

FOREIGN PATENT DOCUMENTS

| | | |
|---|---|---|
| JP | 2007-094237 A | 4/2007 |
| JP | 2008-009341 A | 1/2008 |
| JP | 2008-052225 A | 3/2008 |

* cited by examiner

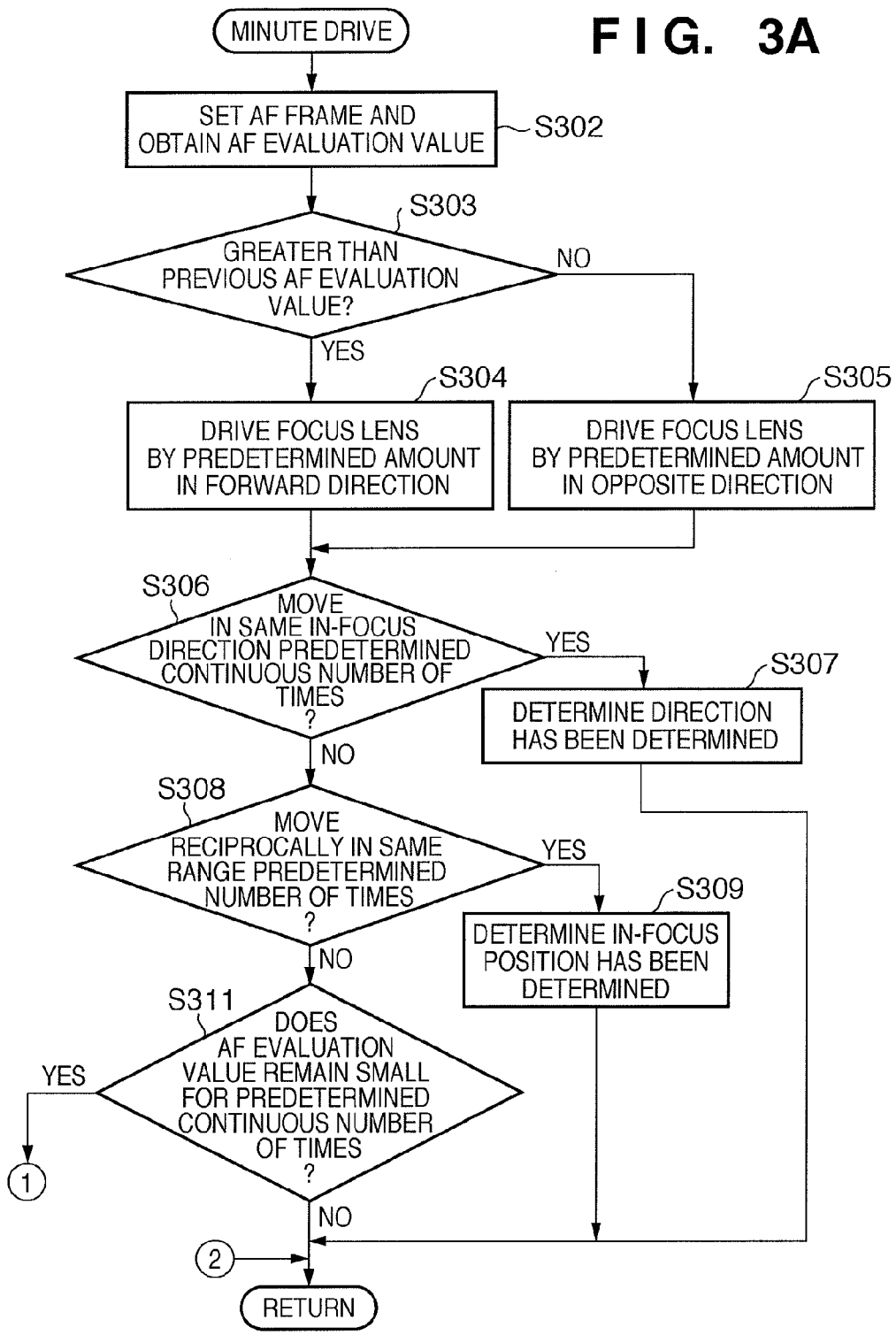

IMAGE CAPTURING APPARATUS AND CONTROL METHOD THEREFOR

CROSS-REFERENCE TO RELATED APPLICATIONS

This application is a continuation of application Ser. No. 13/610,036, filed Sep. 11, 2012; which is a continuation of application Ser. No. 12/417,355, filed Apr. 2, 2009, now U.S. Pat. No. 8,289,439, the entire disclosures of which are hereby incorporated by reference.

BACKGROUND OF THE INVENTION

1. Field of the Invention

The present invention relates to an image capturing apparatus and a control method for the image capturing apparatus, and more particularly, to an image capturing apparatus for carrying out autofocus control and a control method for the image capturing apparatus.

2. Description of the Related Art

For autofocus (AF) control of video cameras and the like, TV-AF type AF control is widely used in which an in-focus position is detected on the basis of the sharpness (contrast) of image signals generated with the use of an image sensor. Specifically, an AF evaluation value indicating the degree of contrast is generated for image signals captured sequentially while moving a focus lens, and the position of the focus lens at which the contrast reaches its maximum is searched as an in-focus position on the basis of the AF evaluation value.

However, in the case of shooting a person, focusing on the background rather than the person may occur due to the relationship in contrast between the person as a main object and the background.

In order to solve such a problem, image capturing apparatuses are known that detect a person and set a focus detection area for the purpose of focusing on the person. For example, image capturing apparatuses which have a face detection function and carry out focus detection for a focus detection area containing a face region (for example, Japanese Patent Laid-Open No. 2006-227080), and image capturing apparatuses which detect a person's eyes and carry out focus detection on the basis of the eyes (for example, Japanese Patent Laid-Open No. 2001-215403) are proposed.

However, in the focus detection using the conventional face detection function described above, in a case in which, for example, the person who is the object approaches suddenly and gets blurred, the amount of change in the AF evaluation value in the TV-AF type AF control is small, and it takes time to detect the direction in which the object is in focus (the in-focus direction). As a result, it takes time to focus, and thus there have been problems with AF tracking ability.

SUMMARY OF THE INVENTION

The present invention is conceived in light of the problems of the conventional art described above, and provides an image capturing apparatus that carries out TV-AF type autofocus control using object information obtained from the image with improved focusing speed.

According to an aspect of the present invention, there is provided an image capturing apparatus that carries out autofocus control by driving a focus lens, comprising: a detection unit which detects a region of a particular object from a captured image; a setting unit which sets a focus detection area for the image based on detection results obtained by the detection unit; a generating unit which generates an AF evaluation value based on a component of a predetermined frequency band contained in the focus detection area of the image; a determination unit which determines an in-focus position search direction based on changes in a size of the region of the particular object detected by the detection unit; and a control unit which carries out focus detection by driving the focus lens based on the in-focus position search direction determined by the determination unit.

According to another aspect of the present invention, there is provided a control method for an image capturing apparatus that carries out autofocus control by driving a focus lens, comprising: a detection step of detecting a region of a particular object from a captured image; a setting step of setting a focus detection area for the image based on detection results obtained in the detecting step; a generating step of generating an AF evaluation value based on a component of a predetermined frequency band contained in the focus detection area of the image; a determination step of determining an in-focus position search direction based on changes in a size of the region of the particular object detected in the detecting step; and a control step of carrying out focus detection by driving the focus lens based on the in-focus position search direction determined in the determination step.

Further features of the present invention will become apparent from the following description of exemplary embodiments with reference to the attached drawings.

BRIEF DESCRIPTION OF THE DRAWINGS

FIGS. 3A and 3B are flowcharts showing details of a minute drive operation performed by the control unit 114 in the first embodiment of the present invention;

DESCRIPTION OF THE EMBODIMENTS

Preferred embodiments of the present invention will now be described in detail in accordance with the accompanying drawings.

First Embodiment

Figure 1:
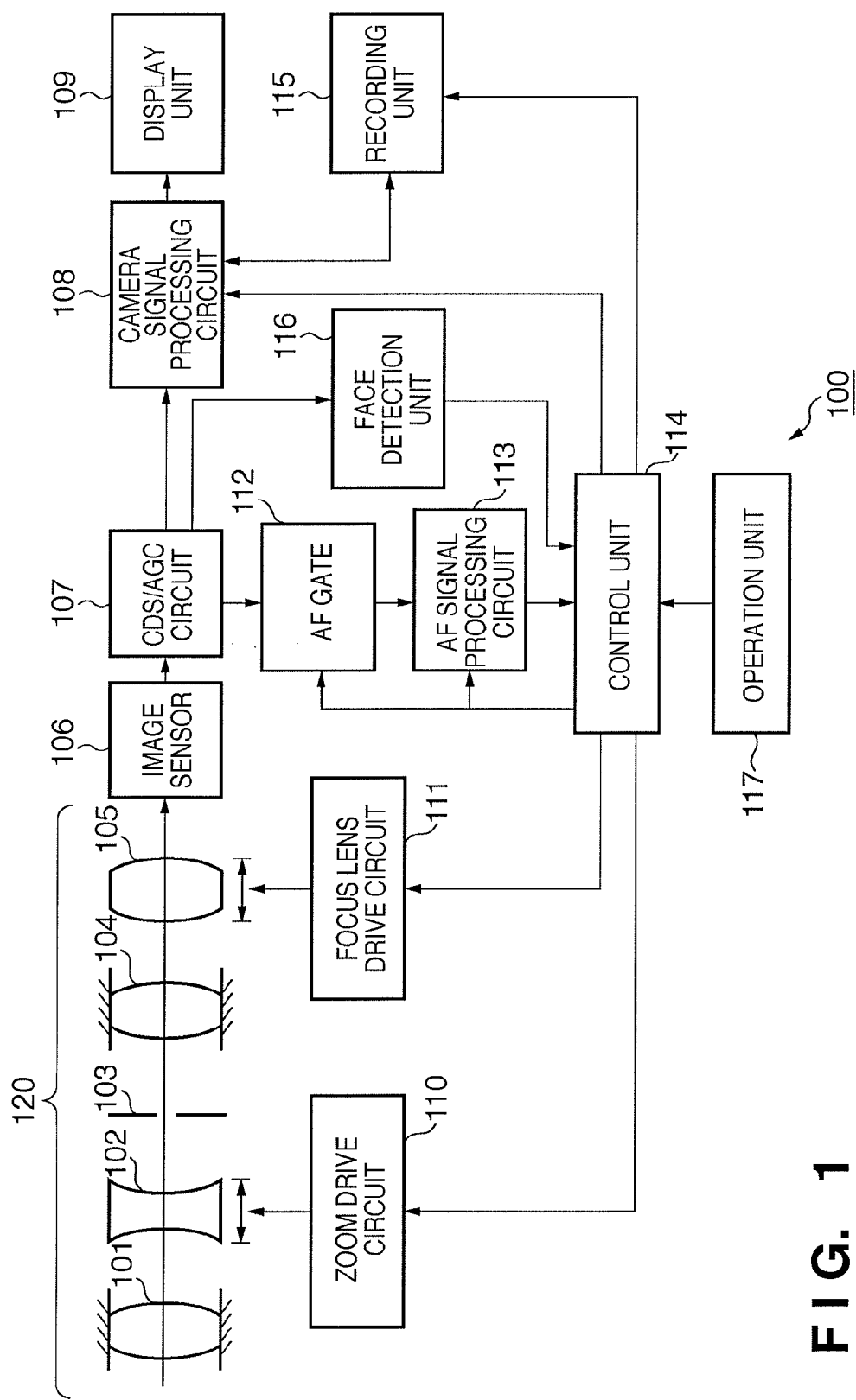
FIG. 1 is a block diagram illustrating a configuration example of a digital video camera 100 as an example of an image capturing apparatus according to a first embodiment of the present invention.

FIG. 1 is a block diagram illustrating a configuration example of a digital video camera 100 as an example of an image capturing apparatus according to a first embodiment of the present invention. It is to be noted that the present invention can also be applied to digital still cameras, as well as any other image capturing apparatuses which have a face detection function and a movie-capturing function and equipment including such an image capturing apparatus.

In FIG. 1, the digital video camera 100 according to the present embodiment includes, as an image capturing optical system, a zoom lens 120 which has an autofocus function. The zoom lens 120 includes a first fixed lens 101, a magnification lens 102 for moving in the optical axis direction to vary the magnification of an optical image, an aperture 103, a second fixed lens 104, and a focus compensator lens 105. The focus compensator lens (hereinafter simply referred to as a focus lens) 105 has both a function of correcting displacement of the focal plane with variable power and a focusing function.

An image sensor 106 is composed of a photoelectric conversion device such as a CCD image sensor or a CMOS image sensor. A CDS/AGC circuit 107 carries out correlated double sampling of and gain adjustment of the output from the image sensor 106.

A camera signal processing circuit 108 applies various types of image processing to the output signal from the CDS/AGC circuit 107 to generate an image signal. A display unit 109 is composed of an LCD or the like, which displays the image signal from the camera signal processing circuit 108. A recording unit 115 records the image signal from the camera signal processing circuit 108 on a recording medium (a magnetic tape, an optical disc, a semiconductor memory, etc.).

A zoom drive circuit 110 moves the magnification lens 102 in response to control exercised by a control unit 114. A focus lens drive circuit 111 moves the focus lens 105 in response to control exercised by the control unit 114. The zoom drive circuit 110 and the focus lens drive circuit 111 are composed of an actuator such as a stepping motor, a DC motor, a vibrating motor, and a voice coil motor.

An AF gate 112 supplies, to an AF signal processing circuit 113 at a subsequent stage, only signals in an area to be used for focus detection (a focus detection area or an AF frame) set by the control unit 114 from among output signals for all of the pixels from the CDS/AGC circuit 107.

The AF signal processing circuit 113 applies, for example, a filter to the pixel signals in the focus detection area supplied from the AF gate 112 to extract a predetermined high-frequency component, specifically a high-frequency component, and generate an AF evaluation value.

The AF evaluation value is output to the control unit 114. The AF evaluation value refers to a value representing the sharpness (the level of contrast) of an image generated on the basis of the output signal from the image sensor 106. However, the AF evaluation value can be utilized as a value representing the focus state of the image capturing optical system, because the sharpness of an in-focus image is higher whereas the sharpness of an out-of-focus image is lower.

The control unit 114 is, for example, a microcomputer, which controls operation of the entire digital video camera 100 by executing a control program stored in advance in a ROM, not shown, to control each unit of the digital video camera 100. The control unit 114 controls, based on the AF evaluation value provided from the AF signal processing circuit 113, the focus lens drive circuit 111 to carry out AF control (autofocus control) operation. Further, in accordance with a zoom request from an operation unit 117 described below, the control unit 114 controls the zoom drive circuit 110 to vary the magnification of the zoom lens 120.

A face detection unit 116 applies face detection processing based on a known face detection technique to the image signal output by the CDS/AGC circuit 107 to detect a face region as an example of a person region in the image. Known face detection techniques include a learning-based approach utilizing a neural network or the like, and an approach in which template matching is used to search for a distinctively shaped site, such as an eye, a nose, and a mouth, from an image, and treats the site as a face if the degree of similarity is high. In addition, many other approaches have been proposed, such as an approach of detecting the image feature quantity such as the color of skin and the shape of an eye and using a statistical analysis. In general, two or more of these approaches are combined to improve the accuracy of focus detection. Specific examples include a method of utilizing the wavelet transform described in Japanese Patent Laid-Open No. 2002-251380 and the image feature quantity to carry out face detection.

The face detection unit 116 outputs information to the control unit 114 as a face detection result, with which the position and size of the region detected as, for example, a person's face (face region) can be identified in the image. Based on this face detection result, the control unit 114 directs the AF gate 112 to set a focus detection area in a region containing the face region in the image.

The operation unit 117 refers to a group of input devices such as a switch, a button, and a dial for the user to input a variety of requests and settings to the digital video camera 100. The operation unit 117 includes a shooting start/pause button, a zoom switch, a still image capturing button, a direction button, a menu button, an execution button, etc.

Figure 2:
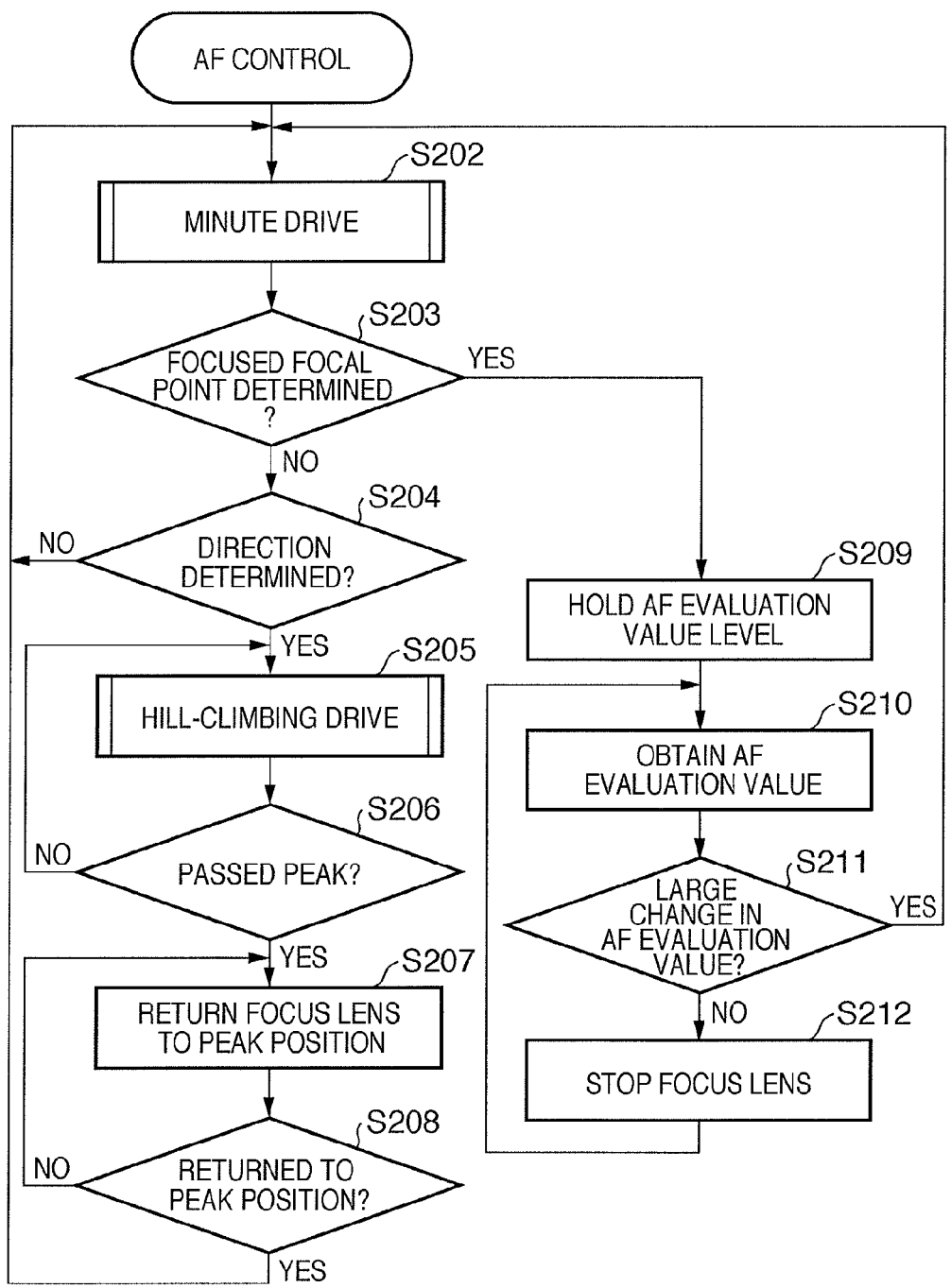
FIG. 2 is a flowchart showing details of AF control exercised by a control unit 114 in the first embodiment of the present invention.

Next, details of AF control executed by the control unit 114 will be described with reference to a flowchart shown in FIG. 2.

In S202, the control unit 114 carries out a minute drive operation and determines whether the state corresponds to an in-focus state, and if not, which direction in terms of perspective the in-focus position is located in. Details of the minute drive operation will be described below with reference to FIGS. 3A and 3B.

In S203, the control unit 114 bifurcates the processing, depending on the determination result in S202. In a case in which the minute drive operation in S202 determines that the state corresponds to an in-focus state, the control unit 114 proceeds with the processing to S209, or to S204 if not.

In S204, the control unit 114 further bifurcates the processing, depending on whether or not the direction of the in-focus position has been determined in S202. More specifically, if the direction has been determined, the control unit 114 proceeds with the processing to S205, or if not, the control unit 114 returns the processing to S202 to continue the minute drive operation.

In S205, the control unit 114 controls the focus lens drive circuit 111, and applies a hill-climbing drive operation to the focus lens at high speed in the direction in which the AF evaluation value is increased. Details of the hill-climbing drive operation will be described below with reference to FIG. 5.

In S206, the control unit 114 determines whether or not the AF evaluation value has passed the peak value in the hill-climbing drive operation in S205. If it is determined that the AF evaluation value has passed the peak value, the control unit 114 proceeds with the processing to S207, or if not, the control unit 114 continues the hill-climbing drive operation in S205.

In S207, the control unit 114 controls the focus lens drive circuit 111, and returns the focus lens 105 to the lens position at which the AF evaluation value obtained during the hill-climbing drive operation assumes its peak value. In S208, the control unit 114 checks whether or not the focus lens 105 has been returned to the position at which the AF evaluation value is at its maximum value. Then, if the focus lens 105 has been returned, the control unit 114 returns the processing to S202 to continue the minute drive operation. If the focus lens 105 has not been returned, the control unit 114 returns the processing to S207 to continue the operation for returning the position of the focus lens 105.

Next, focusing operation from S209 will be described.

In S209, the control unit 114 holds the AF evaluation value from the AF signal processing circuit 113. In S210, the control unit 114 obtains the latest AF evaluation value from the AF signal processing circuit 113. In S211, the control unit 114 compares the AF evaluation value held in S209 with the AF evaluation value newly obtained in S210 to determine whether or not the change in the AF evaluation value is large. Specifically, if the difference between the AF evaluation values is a predetermined value or more, the control unit 114 determines that the change is large, and returns the processing to S202 to restart minute drive operation. On the other hand, if it is not determined that the change in the AF evaluation value is large, the control unit 114 controls the focus lens drive circuit 111 to stop the focus lens 105, and returns the processing to S210.

Figure 3B:
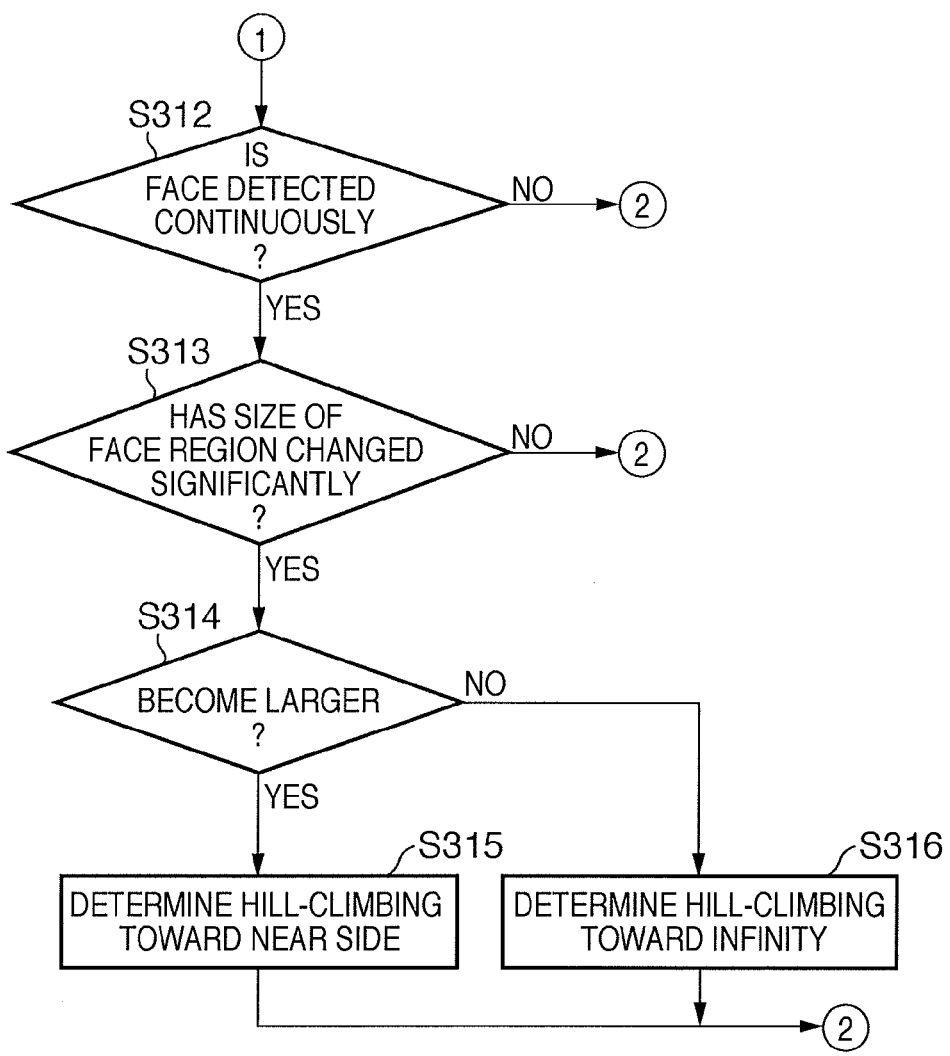

Next, the minute drive operation carried out in S202 of FIG. 2 will be described with reference to a flowchart shown in FIGS. 3A and 3B.

In S302, the control unit 114 obtains the latest face detection result. Then, the control unit 114 determines an AF frame (focus detection area) depending on whether or not there is any detected face region, and sets the AF gate 112 so as to supply only pixel signals within the determined AF frame to the AF signal processing circuit 113. Further, the control unit 114 obtains an AF evaluation value which is generated by the AF signal processing circuit 113 on the basis of the pixel signals within the AF frame.

The control unit 114 also stores a predetermined number of obtained face detection results and AF evaluation values in an internal memory, not shown.

In S303, the control unit 114 determines whether or not the AF evaluation value obtained in S302 is larger than the previously obtained AF evaluation value. Then, if the currently obtained AF evaluation value is the previously obtained AF evaluation value or less, the control unit 114, in S305, controls the focus lens drive circuit 111 to move the focus lens 105 by a predetermined amount in a direction opposite to the previous direction.

On the other hand, if the currently obtained AF evaluation value is greater than the previously obtained AF evaluation value, the control unit 114, in S304, controls the focus lens drive circuit 111 to move the focus lens 105 a predetermined amount farther in the same direction as the previous direction.

Figure 4:
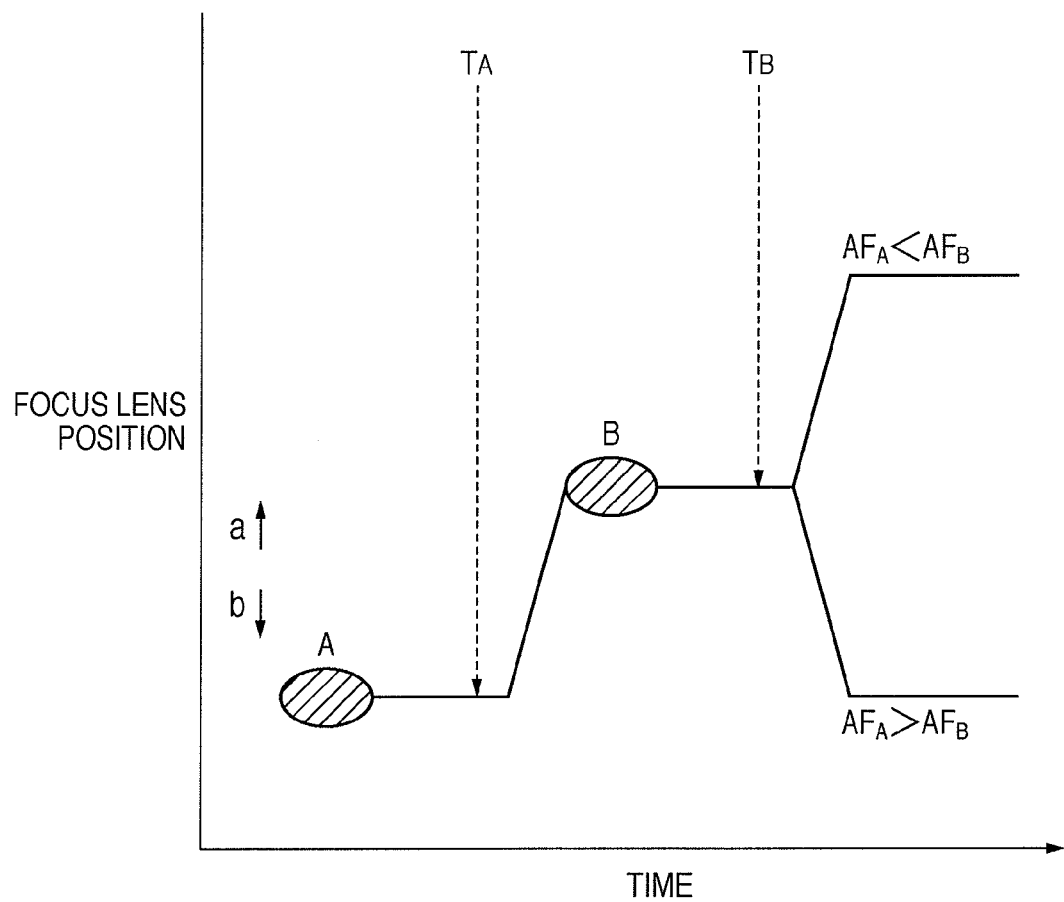
FIG. 4 is a diagram illustrating an example of changes in the position of a focus lens 105 during a minute drive operation in the first embodiment of the present invention.

FIG. 4 is a diagram illustrating an example of changes in the position of the focus lens 105 during a minute drive operation.

In FIG. 4, the control unit 114 obtains, at time $T_A$, an AF evaluation value $AF_A$ generated by the AF signal processing circuit 113 for a focus detection area of image signals generated by the CDS/AGC circuit 107 on the basis of charges accumulated in the image sensor 106 for a period of time A. Then, a minute operation drive moves the focus lens 105 in the direction of an arrow a by a predetermined amount, and the control unit 114 obtains, at time $T_B$, an AF evaluation value $AF_B$ for image signals taken by the image sensor 106 for a period of time B.

Then, the control unit 114 compares the AF evaluation values $AF_A$ and $AF_B$, and keeps moving the focus lens 105 in the forward direction (the same direction as the previous direction, that is, the direction of the arrow a) by a predetermined amount if $AF_A<AF_B$. On the other hand, if $AF_A>AF_B$, the control unit 114 moves the focus lens 105 in the opposite direction (the direction opposite to the previous direction, that is, the direction of an arrow b) by a predetermined amount.

It is to be noted that the travel distance of the focus lens 105 in S304 and S305 in the minute drive operation can be adapted such that the change in focusing state with one movement is not able to be determined when imaging signals are displayed on the display unit 109 or the like. Specifically, the travel distance can be adapted such that the position after moving the focus lens 105 is located in the depth of focus.

In S306, the control unit 114 checks the determination result for the magnitude correlation of the AF evaluation result in S303, or whether or not the driving direction of the focus lens 105 has been changed a predetermined continuous number of times, that is, whether or not the direction determined to be an in-focus direction has been the same direction a predetermined number of times. If the direction determined to be an in-focus direction has not been changed a predetermined continuous number of times, the control unit determines, in S307, that the direction has been determined, and terminates the minute drive operation.

On the other hand, in a case in which the direction determined to be an in-focus direction is not the same a predetermined continuous number of times, the control unit 114 determines in S308 whether or not the position of the focus lens 105 moves reciprocally within the same range a predetermined number of times. Alternatively, whether or not the position of the focus lens 105 is within a predetermined range for a predetermined period of time can be determined. In a case in which it is determined that either condition is satisfied, the control unit 114 terminates in S309 the minute drive operation as a result of determining that the in-focus position has been determined. In a case in which neither condition is satisfied in S308, the control unit 114 proceeds with the processing to S311 as a result of determining that neither the in-focus direction nor the in-focus position has been determined.

In a case in which it is determined that neither the in-focus direction nor the in-focus position has been determined, in S311 the control unit 114 checks the AF evaluation values stored in the internal memory or the like, not shown, and determines if the AF evaluation value is small for predetermined period of time (that is, a predetermined continuous number of times). Specifically, the control unit 114 may determine whether or not AF evaluation values remain equal to or less than a predetermined threshold value $Th_{AF}$. It is to be noted that the threshold value $Th_{AF}$ can be set to any arbitrary value corresponding to an AF evaluation value at a time when the object is not in focus.

In a case in which it is determined in S311 that the AF evaluation values remain small for a predetermined continuous period of time, in S312 the control unit 114 determines whether or not a face has been detected continuously. Here, it is assumed that whether or not a face region has been detected continuously is determined from the face detection results obtained in S302 and the most recent face detection results. If it is determined that a face region has not been detected continuously, then the control unit 114 terminates the minute drive operation. On the other hand, if it is determined that a face region has been detected continuously, then in S313 the control unit 114 compares the face detection results stored in the internal memory, not shown, and the face detection results obtained in S302 to determine if the size of the face region has changed significantly. Specifically, the control unit 114 may determine whether or not an absolute value of a difference in the size (number of pixels) or proportions (%) of the face region included in the face detection results is equal to or greater than a predetermined threshold value $Th_f$ (number of pixels or %). If the change in the size of the face region is less than the threshold value $Th_f$, the control unit 114 terminates the minute drive operation.

By contrast, in a case in which it is determined that the change in the size of the face region is significant, in S314 the control unit 114 determines whether the face region has become larger or not (i.e., smaller). Here, in a case in which it is determined that the face region has become larger, the object (person) has probably come closer. Accordingly, the control unit 114, in S315, determines the direction of the hill-climbing drive operation to be executed in S205 as in the direction of the near side and terminates the minute drive operation. On the other hand, in a case in which it is determined that the face region has not become larger (i.e., has become smaller), the object (person) has probably moved back. Accordingly, the control unit 114, in S316, determines the direction of the hill-climbing drive operation as in the direction of infinity and terminates the minute drive operation.

Thus, as described above, in the minute drive operation, in a case in which neither the in-focus direction nor the in-focus position has been determined, the in-focus direction (the direction in which to search for the in-focus position) in autofocus control is determined according to the direction of movement of the object as predicted from changes in the size of the detected face region. As a result, the number of repetitions of the minute drive operation can be reduced and processing can proceed to the hill-climbing drive operation, making it possible to provide better AF responsiveness as well as faster focusing speed.

In order to enhance stability and AF accuracy, it can be determined whether the focus condition has become "approximately in-focus" or "close to in-focus" condition or not before the determination of continuity of the face detection at S312 is performed. If it is determined that the focus condition has become "approximately in-focus", the control unit 114 terminates the minute drive operation by omitting S313 and the steps following.

The "approximately in-focus" condition can be determined based on, for example, an AF evaluation value obtained as a ratio between a "Max-Min" evaluation value and a "Top Evaluate Peak" evaluation value.

The "Max-Min" evaluation value can be generated by obtaining a difference between a maximum value Max and a minimum value Min (i.e., Max−Min) of luminance data for each horizontal line of an image; and evaluating the maximum difference among the differences by scanning the differences in vertical direction as the "Max−Min" evaluation value ("MM").

The "Top Evaluate Peak" evaluation value can be generated by extracting a high-frequency component of the image using a high pass filter (HPF) or a band pass filter (BPS) having a high cut-off frequency; obtaining a maximum value as a Top Evaluation value ("TE") for each horizontal line; and evaluating the maximum value among the TEs by scanning the TEs in vertical direction as the "Top Evaluate Peak" evaluation value ("TEP").

The ratio between these evaluation values TEP/MM corresponds to a signal obtained by differentiating TEP with a contrast difference signal MM. Accordingly, a larger TEP/MM means better focus condition while TEP/MM being close to zero means a significant defocus condition.

In addition, before performing the determination in S313, that evaluates whether the size of the detected face region has significantly changed is performed in S313, it can be further determined either whether the size of face region currently detected is equal to or larger than a predetermined size or whether the size of the face region has been constantly increasing or decreasing.

For example, by comparing sizes of a face region every four times of the face detection and if a difference of the sizes keeps larger (smaller) than a predetermined value for two continuous comparisons, it can be determined as the size of the face region has been constantly increasing (decreasing).

If the size of the face region has not been constantly increasing or decreasing, the control unit 114 terminates the minute drive operation by omitting S313 and the steps following.

If the current face region is smaller than the predetermined size, S313 and the steps following can be omitted to ignore a size change for a small face region.

By skipping S313 and the following steps if it is determined that the current focus condition is "approximate in-focus" condition, the current face region is smaller than the predetermined size, or the size of the face region has not constantly increasing or decreasing, a hill-climbing involving a large movement of the focusing lens can be avoided.

In case where such a determination is made, it is not likely to necessary to perform the hill-climbing. Therefore, the stability of focusing condition as well as the accuracy of AF can be improved.

Figure 5:
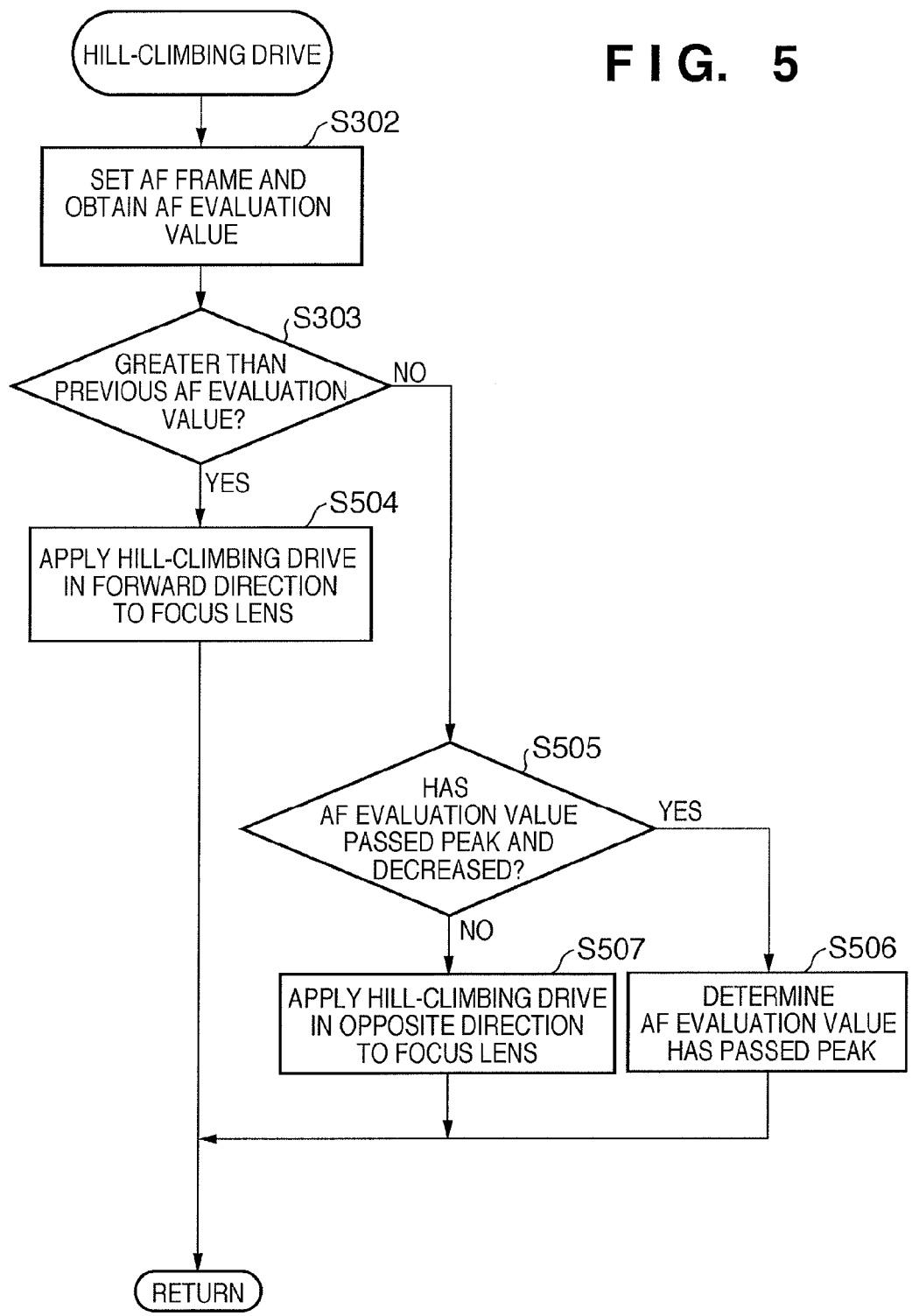
FIG. 5 is a flowchart showing details of hill-climbing drive operation performed by the control unit 114 in the first embodiment of the present invention.

Next, the hill-climbing drive operation carried out in S205 of FIG. 2 will be described with reference to a flowchart shown in FIG. 5. It is to be noted that in FIG. 5, the steps for carrying out the same operations as those in FIGS. 3A and 3B are denoted by the same reference numerals as those in FIGS. 3A and 3B to omit detailed descriptions thereof.

Also in the hill-climbing drive operation, in the same way as in the minute drive operation, the control unit 114 first obtains face detection results and sets an AF frame, and obtains an AF evaluation value in accordance with the settings (S302). Then, the control unit 114 evaluates the magnitudes of the previously obtained AF evaluation value and the currently obtained AF evaluation value (S303), and bifurcates the processing.

If the currently obtained AF evaluation value is greater than the previously obtained AF evaluation value, the control unit 114, in S504, controls the focus lens drive circuit 111 to apply hill-climbing drive to the focus lens 105, that is, to move the focus lens 105 at a predetermined speed in the same direction as the previous direction (forward direction), and terminates the processing.

On the other hand, if the currently obtained AF evaluation value is the previously obtained AF evaluation value or less, the control unit 114, in S505, determines whether or not the AF evaluation value has passed the peak and decreased. Then, in a case in which it is determined that the AF evaluation value has passed the peak and decreased, the control unit 114 proceeds with the processing to S506 to terminate the processing as a result of passing the peak.

In a case in which it is not determined in S505 that the AF evaluation value has passed the peak and decreased, the control unit 114, in S507, controls the focus lens drive circuit 111 to apply hill-climbing drive to the focus lens 105, that is, to move the focus lens 105 at a predetermined speed in a direction opposite to the previous direction, and terminates the processing.

Figure 6:
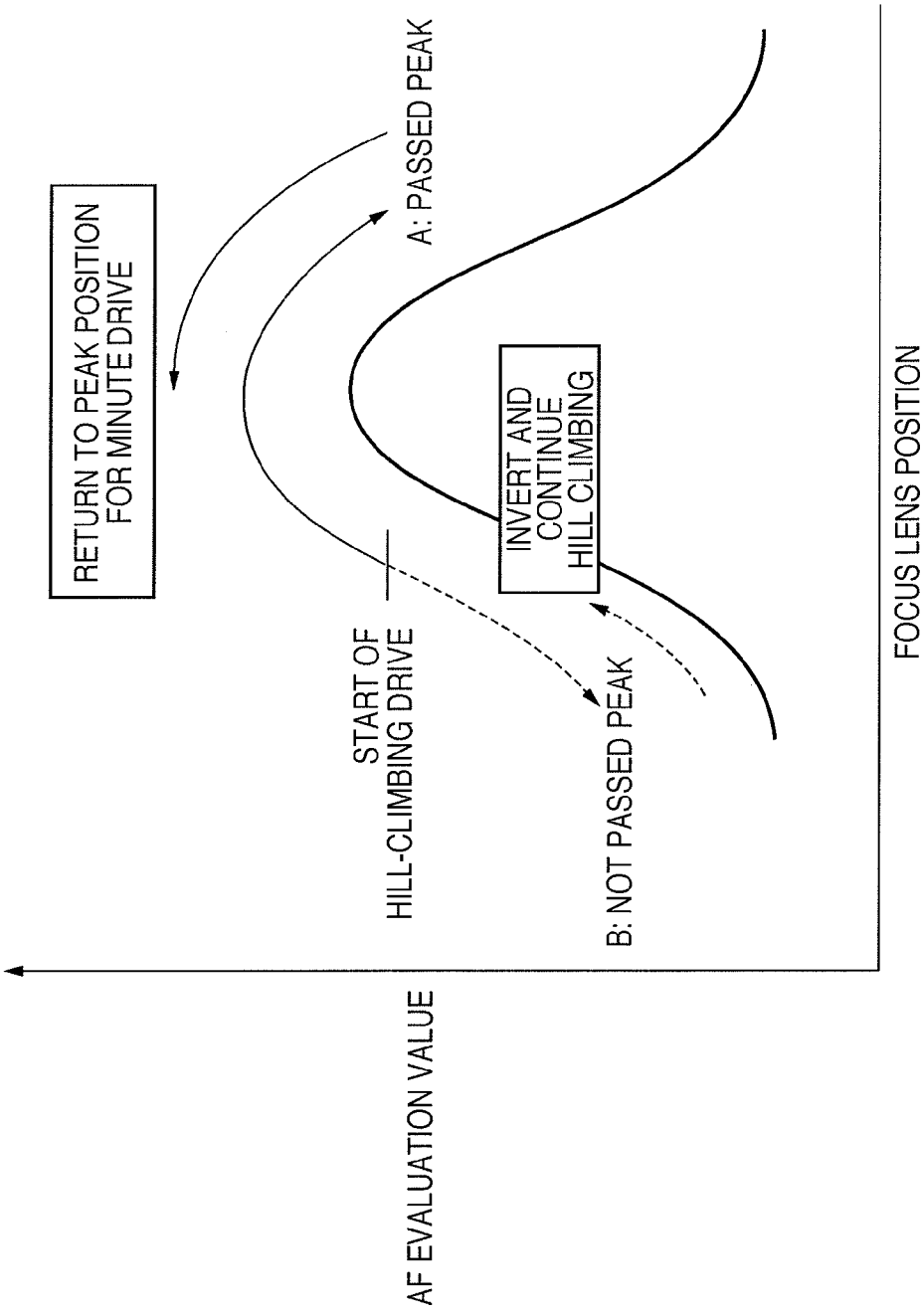
FIG. 6 is a diagram illustrating examples of the magnitude of an AF evaluation value and of drive operation of the focus lens 105, during a hill-climbing drive operation in the first embodiment of the present invention.

FIG. 6 is a diagram illustrating examples of the magnitude of an AF evaluation value and of drive operation of the focus lens 105, during a hill-climbing drive operation.

In FIG. 6, in a case in which the focus lens 105 is driven rightward in the figure from the start position of the hill-climbing drive, it is determined that the AF evaluation value has passed the peak (maximum value) and decreased as indicated by an arrow A. In this case, the hill-climbing drive operation is terminated as a result of passing the in-focus position, and the focus lens 105 is returned to the position at which the maximum value of the AF evaluation value is obtained (S207 and S208 in FIG. 2) to move to the minute drive operation (S202).

On the other hand, in a case in which the focus lens 105 is driven leftward in the figure from the start position of the hill-climbing drive, it is determined that the AF evaluation value has decreased without passing the peak as indicated by an arrow B. In this case, it is determined that the direction of movement of the focus lens 105 is wrong, and the hill-climbing drive operation is continued in the opposite direction. It is to be noted that the travel distance of the focus lens 105 for a given length of time is larger than that during the minute drive operation described above.

As described above, the control unit 114 carries out the AF control operation for moving the focus lens 105 to the position at which the AF evaluation value assumes its maximum value while repeating the cycle: the determination of necessity of restart (redo from minute drive)→minute drive→hill-climbing drive→minute drive→restart determination.

Thus, as described above, the present embodiment can provide an image capturing apparatus that carries out TV-AF type autofocus control using object information obtained from the image with improved focusing speed. Specifically, in an image capturing apparatus that detects a particular object from a captured image, sets an AF frame on a region of the object thus detected, and carries out autofocus control, in a case in which the direction in which to search for the in-focus position cannot be determined from the AF evaluation value, the apparatus detects changes in the size of the region of the object. Then, by determining the direction in which to search for the in-focus position in the focus detection process according to a direction of movement of the object predicted on the basis of the change in the size of the region of the object, AF responsiveness as well as focusing speed can be enhanced.

In the present embodiment, the face detection AF frame has been used as an example of an AF frame set for a region of a particular object. However, even in a case in which an AF frame is to be set not only for a person's face but also for a region of any other object, such as another object or a person's other site, it is possible to apply the basic concept of the present invention, namely, predicting the direction of movement of the object based on changes in the size of the region of the object and determining the direction in which to search for the in-focus position.

In addition, in order to facilitate an understanding of the invention, a description has been given of determining the direction in which to search for the in-focus position based on changes in the size of the region of the object in a case in which the direction in which to search for the in-focus position cannot be determined from the AF evaluation value. However, as described above, the basic concept of the present invention, namely, predicting the direction of movement of the object based on changes in the size of the region of the object and determining the direction in which to search for the in-focus position, does not require that the direction in which to search for the in-focus position cannot be determined from the AF evaluation value.

Moreover, in the present embodiment, in the process of determining whether or not the AF evaluation value remains small for a predetermined continuous period of time, not particular mention has been made of a lower limit for the AF evaluation value. However, if the AF evaluation value is too low, the reliability of the focus detection cannot be maintained, in which case a threshold value that sets a lower limit for the AF evaluation value may be introduced in S311.

Specifically, in S311, in a case in which $Th_{fd}$<AF threshold value=<$Th_{AF}$ for a predetermined continuous number of times (that is, a predetermined period of time), processing may proceed to S312. It is to be noted that $Th_{fd}$ is the AF evaluation value that corresponds to that minimum in-focus state which can still maintain reliable face detection.

In the foregoing description the focus detection area is a region that includes a face region. However, in addition to a focus detection area according to the face region, it is also possible to set a focus detection area that includes the focus detection area according to a face region but which is larger than such focus detection area according to the face region, and calculate using the image signals obtained from both focus detection areas to generate the AF evaluation value. Calculating the AF evaluation value in this way enables stable focus on the object.

Alternatively, it is also possible to set a focus detection area that tracks the face region and a focus detection area that does not track the face region to calculate and generate the AF evaluation value using the image signal output obtained from both focus detection areas. Calculating the AF evaluation value in this way enables stable focus on the object.

Other Embodiments

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Further, the computer program for implementing the embodiments described above may in part be constituted as firmware such as an expansion board or the like connected to the computer, or may be executed by a CPU provided on an expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-101820, filed on Apr. 9, 2008, which is hereby incorporated by reference herein its entirety.

What is claimed is:

1. An image capturing apparatus that carries out autofocus control by driving a focus lens, comprising:
    a detection unit which detects a region of a particular object from a captured image;
    a setting unit which sets a focus detection area based on detection results obtained by the detection unit;
    a generating unit which generates an AF evaluation value based on a component of a predetermined frequency band contained in the focus detection area of a captured image;
    a determination unit which determines an in-focus position search direction based on a change in a size of the region of the particular object detected by the detection unit; and
    a control unit which determines an in-focus position based on a plurality of AF evaluation values obtained at different positions of the focus lens by driving the focus lens to the different positions based on the in-focus position search direction determined by the determination unit if it is determined that an AF evaluation value is less than a predetermined threshold.

2. The image capturing apparatus according to claim 1, wherein the detection unit detects a face region of a person as the region of the particular object.

3. A control method for an image capturing apparatus that carries out autofocus control by driving a focus lens, comprising:
    a detection step of detecting a region of a particular object from a captured image;
    a setting step of setting a focus detection area based on detection results obtained in the detecting step;
    a generating step of generating an AF evaluation value based on a component of a predetermined frequency band contained in the focus detection area of a captured image;
    a determination step of determining an in-focus position search direction based on a change in a size of the region of the particular object detected in the detecting step; and
    a control step of determining an in-focus position based on a plurality of AF evaluation values obtained at different positions of the focus lens by driving the focus lens to the different positions based on the in-focus position search direction determined in the determination step if it is determined that an AF evaluation value is less than a predetermined threshold.

4. The control method for the image capturing apparatus according to claim 3, wherein the detection step detects a face region of a person as the region of the particular object.

5. An image capturing apparatus that carries out autofocus control by driving a focus lens, comprising:
    a detection unit which detects a region of a particular object from a captured image;
    a setting unit which sets a focus detection area based on detection results obtained by the detection unit;
    a generating unit which generates an AF evaluation value based on a component of a predetermined frequency band contained in the focus detection area of a captured image;
    a determination unit which determines an in-focus position search direction based on a change in a size of the region of the particular object detected by the detection unit; and
    a control unit which determines an in-focus position based on a plurality of AF evaluation values obtained at different positions of the focus lens while driving the focus lens to the different positions based on the in-focus position search direction determined by the determination unit.

6. The image capturing apparatus according to claim 5, wherein the detection unit detects a face region of a person as the region of the particular object.

7. A control method for an image capturing apparatus that carries out autofocus control by driving a focus lens, comprising:
    a detection step of detecting a region of a particular object from a captured image;
    a setting step of setting a focus detection area based on detection results obtained in the detecting step;
    a generating step of generating an AF evaluation value based on a component of a predetermined frequency band contained in the focus detection area of a captured image;
    a determination step of determining an in-focus position search direction based on a change in a size of the region of the particular object detected in the detecting step; and
    a control step of determining an in-focus position based on a plurality of AF evaluation values obtained at different positions of the focus lens while driving the focus lens to the different positions based on the in-focus position search direction determined in the determination step.

8. The control method for the image capturing apparatus according to claim 7, wherein the detection step detects a face region of a person as the region of the particular object.

9. An image capturing apparatus that carries out autofocus control by driving a focus lens, comprising:
    a detection unit which detects a region of a particular object from a captured image;
    a setting unit which sets a focus detection area based on detection results obtained by the detection unit;
    a generating unit which generates an AF evaluation value based on a component of a predetermined frequency band contained in the focus detection area of a captured image;
    a determination unit which determines an in-focus position search direction based on a change in a size of the region of the particular object detected by the detection unit; and a control unit which determines an in-focus position based on a plurality of AF evaluation values obtained at different positions of the focus lens while driving the focus lens to the different positions based on the in-focus position search direction determined by the determination unit, wherein said control unit drives the focus lens in a direction of near side if it is determined that the size of the region of the particular object currently detected by the detection unit is larger than the size of the region of the particular object previously detected by the detection unit, and wherein said control unit drives the focus lens in a direction of infinity if it is determined that the size of the region of the particular object currently detected by the detection unit is smaller than the size of the region of the particular object previously detected by the detection unit.

10. The image capturing apparatus according to claim 9, wherein the detection unit detects a face region of a person as the region of the particular object.

11. A control method for an image capturing apparatus that carries out autofocus control by driving a focus lens, comprising:

a detection step of detecting a region of a particular object from a captured image;

a setting step of setting a focus detection area based on detection results obtained in the detecting step;

a generating step of generating an AF evaluation value based on a component of a predetermined frequency band contained in the focus detection area of a captured image;

a determination step of determining an in-focus position search direction based on a change in a size of the region of the particular object detected in the detecting step; and a control step of determining an in-focus position based on a plurality of AF evaluation values obtained at different positions of the focus lens while driving the focus lens to the different positions based on the in-focus position search direction determined in the determination step, wherein said control step comprising:

a first step of driving the focus lens in a direction of near side if it is determined that the size of the region of the particular object currently detected by the detection unit is larger than the size of the region of the particular object previously detected by the detection unit, and a second step of driving the focus lens in a direction of infinity if it is determined that the size of the region of the particular object currently detected by the detection unit is smaller than the size of the region of the particular object previously detected by the detection unit.

12. The control method for the image capturing apparatus according to claim 11, wherein the detection step detects a face region of a person as the region of the particular object.

* * * * *